Figure 3:
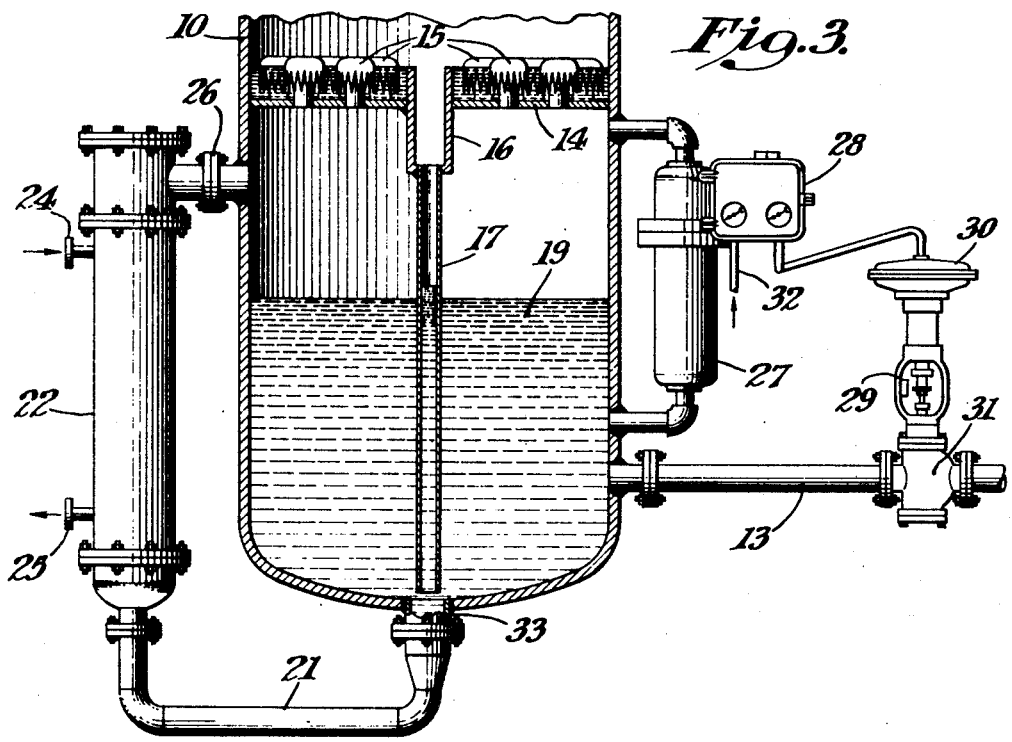

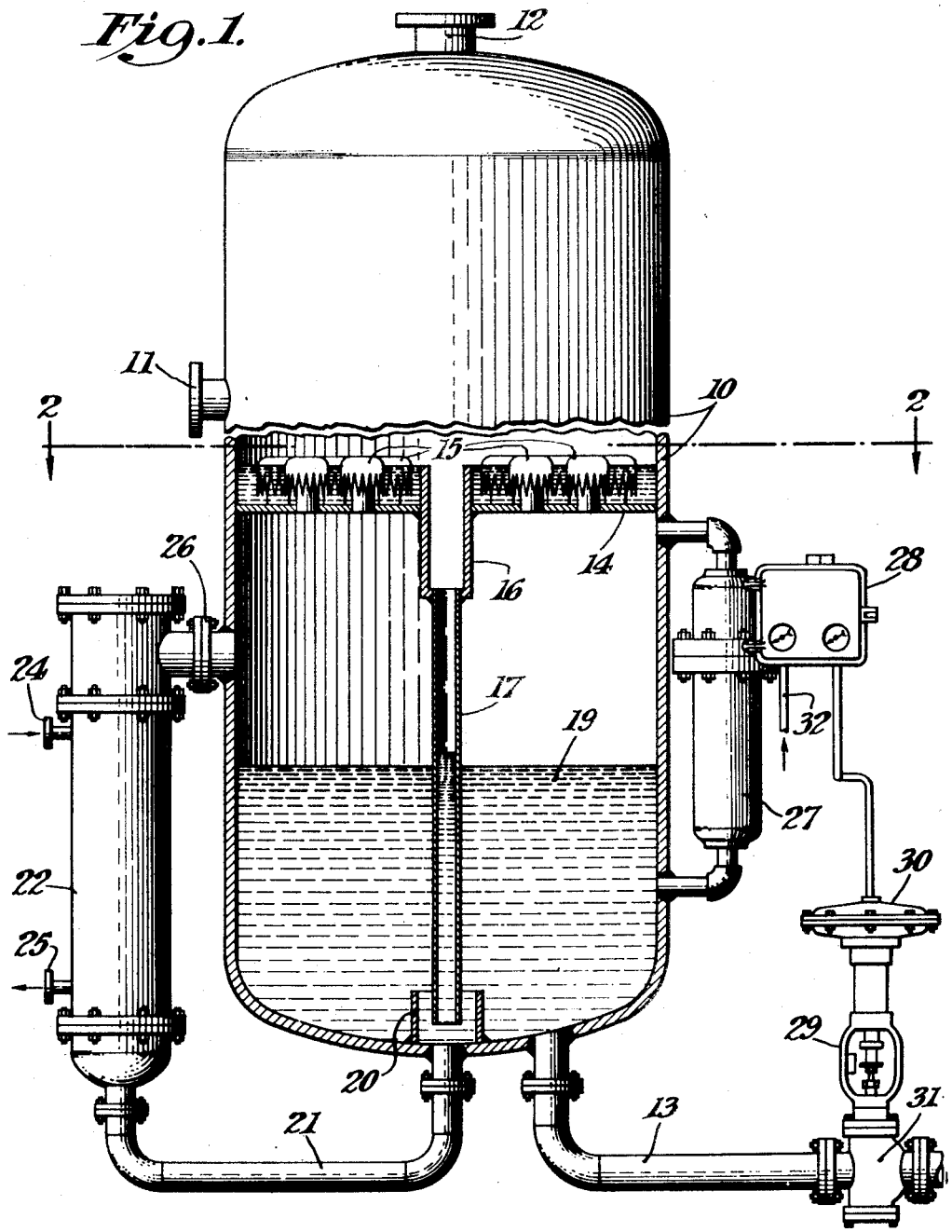

INVENTOR
Wheaton W. Kraft
BY Nathaniel Ely
ATTORNEY

Patented Dec. 12, 1950

2,534,173

UNITED STATES PATENT OFFICE 2,534,173

FEED MEANS FOR THE REBOILER OF A FRACTIONATING COLUMN

Wheaton W. Kraft, Scarsdale, N. Y., assignor to The Lummus Company, New York, N. Y., a corporation of Delaware Application August 1, 1947, Serial No. 765,593

3 Claims. (Cl. 202—153)

This invention relates to fractional distillation, and more particularly to an improved method and apparatus for supplying heat to a liquid fraction at the bottom of a fractionating column to effect said distillation.

In general there are two different and basic reboiler systems in widespread use today—the once-through reboiler and the circulating reboiler. In the once-through system, the reflux liquid descending in the distillation column is collected on the first or bottom plate of the column and by suitable weir means on this plate a liquid accumulation is maintained which may be then passed directly from the first plate to the reboiler, usually mounted adjacent to the distillation column. The liquid passing through the reboiler is heated and partially vaporized by indirect heat exchange with a suitable heating medium flowing in the reboiler bundle, and the partially vaporized mixture is then passed back to the distillation column, entering the column at some point below the first plate. The vapors then pass up the column and the remaining liquid may be drawn off as bottoms product.

In the circulating system the reflux liquid in the column is accumulated in a liquid reservoir below the bottom plate of the column where it is mixed with unvaporized liquid discharging from the reboiler. A portion of the liquid in the accumulating zone is heated and partially vaporized in the reboiler, from whence it is passed back to the column entering at some suitable point below the first plate in the column.

There are several advantages and disadvantages in both of these systems. The main disadvantage in the once-through reboiler is the tendency of this system to "vapor binding." Vapor binding occurs when an excessive amount of heat is applied to the reboiler or when the rate of liquid circulation in the reboiler decreases as, for instance, when the feed to the distillation column is interrupted or when the amount of reflux from the overhead condenser is decreased. When this happens, vaporization in the reboiler becomes excessive and the pressure in the reboiler may increase to a point where it counter-balances the liquid head in the downflow pipe from the bottom plate of the column thereby effectively stopping any further flow of liquid to the reboiler. With no liquid to vaporize in the reboiler the temperature at the surface of the tubes in the reboiler bundle will rapidly rise to the temperature of the heating medium which may be several hundred degrees higher than the liquid entering the reboiler from the column. As a result, the material in the reboiler is subjected to concentrated heating for an appreciable time period compared to that existing with normal flow which may cause decomposition of polymerization thereby depositing material on the tubes. In addition, due to the excessive temperature in the bundle, the tubes may warp.

Where conditions exist which will cause "vapor binding," the control means for supplying heat to the reboiler may react violently to discontinue or sharply reduce the heating medium supply. This in turn may eliminate "vapor binding" and violently re-establish flow of liquid to the reboiler. A repetition of this cycle is transmitted to the fractionating column and the surging operation induced thereby often takes a great deal of time and attention to smooth out.

However, the once-through reboiler does have the material advantage of requiring less heat exchange surface in the tube bundle for the same amount of heat input to the column as compared to the heat exchange area required in a circulating reboiler. The reason for this is that in the once-through system the reflux liquid passing to the reboiler from the bottom plate is at a lower temperature than the liquid in the bottom of the column, and as a result, the difference in temperature between the liquid to be heated and the heating medium will be greater in the once-through system than in the circulating system. With this greater temperature difference a smaller heat exchange surface may be used in the reboiler of the once-through system to pass the same amount of heat. The once-through reboiler also has the advantage that all of the material is subjected to heat and by-passing is avoided.

I find that by suitably combining the two systems the advantages of each may be attained without their disadvantages and this forms the basis of my invention. In principle, my invention contemplates passing the reflux liquid to the reboiler alone or mixed with a part of the bottoms, the proportion of bottoms being determined and controlled by the static head in the accumulating zone with reference to the dynamic head or pressure drop through the reboiler. This type of circulation in a reboiler is called "preferential flow."

The principal object of my invention is to provide a flexible reboiler system wherein the composition of a liquid being heated in the reboiler may be proportioned between that flowing down the column as reflux and that in the bottom of the column so that the range of column bottoms liquid circulating may be none or an appreciable amount.

It is another object of my invention to provide conditions such that a bottoms product of substantially uniform composition may be withdrawn continuously from the column.

It is a still further object of my invention to prevent vapor binding in a reboiler.

Figure 2:
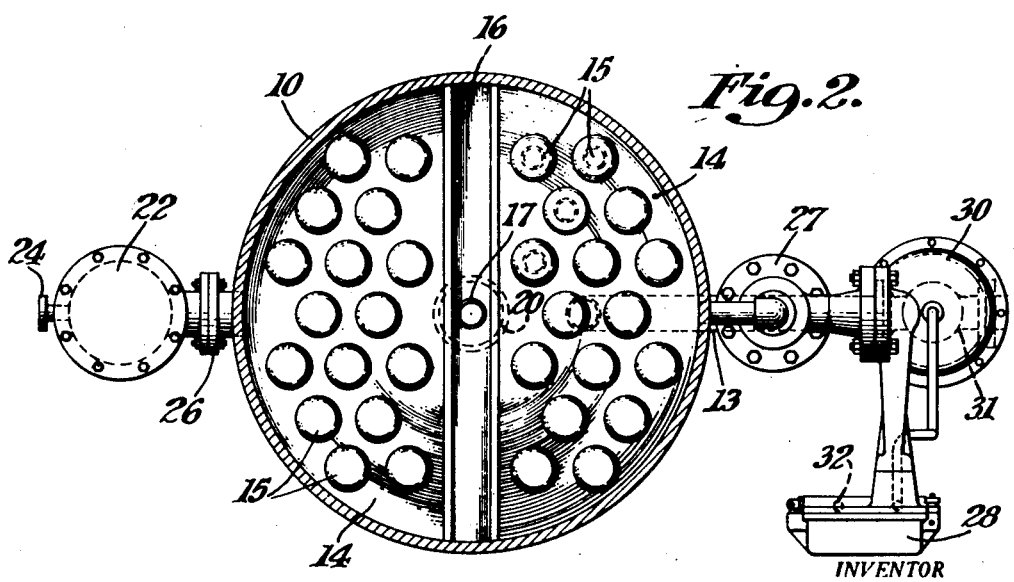

These and other advantages of my invention will be more readily apparent from the following description of a preferred form of embodiment thereof, taken in conjunction with the attached drawings in which, Figure 1 is a partially cut-away elevational view of a distillation column and reboiler adapted to show my invention, Figure 2 is a horizontal cross-sectional view of the column of Figure 1 taken along the line 2—2, Figure 3 is a cut away elevational view of a modified distillation column.

My invention is of particular utility in the separation of hydrocarbon mixtures having components that tend to polymerize at moderately high temperature and pressures. For instance, in the separation of styrene from a styrene containing mixture, such as drip oil, whereby the styrene is removed in a fractionating column as bottoms and the lighter components of the mixture are removed as overhead, a considerable per cent of styrene may be lost due to polymerization of the styrene in the bottom of the column. Since such mixtures contain components boiling close to styrene, a column of a large number of plates is required to effect the separation. This separation is usually carried out under a vacuum but due mainly to the pressure drop across each of these plates, the pressure in the bottom of the column is substantially higher than that at the top of the column and may cause excessive polymerization of the styrene because of the resulting increase in temperature at the base of the column. In the circulating system where the bottoms are continuously cycled through the reboiler, the temperature is at a maximum. In the once-through system, on the other hand, the temperature is substantially lower since there is no recycle through the reboiler, but rather the liquid is passed through but once.

In my preferential flow system, the liquid passed to the reboiler is a combination of that flowing down the column as reflux and that accumulated at the bottom of the column. By controlling the ratio of the bottoms to reflux, the temperature of the bottoms may be maintained at a suitably low level since the reflux is at a lower temperature than the bottoms. At the same time, the column will not have the tendency toward vapor binding or surging as described above, but will, on the other hand, maintain all the advantages of the once-through system as will be apparent from the description below. Referring now to Figure 1, I have shown a distillation column 10 having an inlet 11 for the feed to the column, an outlet 12 for the overhead vapors at the top of the column and an outlet 13 for the bottoms products to be drawn from the liquid reservoir below the first plate 14. As is the usual practice, the overhead vapors leaving at 12 are condensed in a suitable reflux system and a part of the condensate may be returned to the column as reflux at some suitable point below the top of the column. To simplify the drawing, the reflux system has not been shown but is, of course, well known in the art.

The arrangement of the lower part of the column, shown in detail in the partially cut-away view, is particularly adapted to the purposes of the invention and is hereinafter described in detail. In this column, the descending reflux liquid is collected in part on the first or lower plate or tray 14 which is provided with a plurality of bubble caps 15 and a collection trough 16 extending diametrically across the plate 14 as shown in Figure 2. The design of this first plate as shown in Figures 1 and 2, is obviously not a limiting one since any suitable means may be used to collect the reflux liquid accumulated on the plate 14.

The reflux will accumulate on this plate until it rises to the top of the weir formed by the sides of the collection trough 16. The liquid spilling over into the trough 16 is thereafter passed through the downcomer 17 to the draw-off pipe 21 which, it should be noted, is spaced from the downcomer, the spacing between the two being enclosed by the weir 20 for a purpose to be set forth in detail below.

The reflux liquid in downcomer 17 is passed either alone or in conjunction with a part of the bottoms 19 through the draw-off 21 to the reboiler 22 which is shown schematically as a vertical reboiler. The heating medium is introduced at the inlet 24 and the condensate withdrawn at 25. Although a vertical type reboiler is shown, it is, of course, apparent that any suitable type reboiler such as a horizontal reboiler or a direct fired reboiler may be used.

The liquid entering the reboiler is passed in indirect heat exchange relation with the heating medium in the reboiler and is heated so that the entering liquid is partially vaporized. The vapor-liquid mixture, being of a lesser density than the entering liquid, will rise in the reboiler and discharge through line 26 into the bottom of the column below the first plate 14. The vapors will pass up through the bubble caps on the plate 14 and the liquid will be accumulated as bottoms, generally designated as 19.

Circulation of liquid from column 10 through reboiler 22 is due to the gas lift or thermo-syphon effect resulting from the partial vaporization of the liquid in the reboiler. Since the density of this vapor-liquid mixture is less than that of the liquid entering the reboiler in line 21, the mixture will pass from the reboiler through line 26 when there is a sufficient head of liquid in the bottom of column 10. It is apparent, therefore, that this system must be operated so that the liquid head in the bottom of column 10 is equal to the static head of the mixture in the reboiler 22 plus the pressure drop due to friction in the reboiler 22 to maintain flow through the reboiler circuit.

The volume of liquid flowing to the reboiler in the draw-off line 21 is determined by the balance between the level of the bottoms and what may be called the "equivalent liquid level" of the vapor liquid mixture in the reboiler 22. By "equivalent liquid level" is meant the height of a column of liquid of a density equal to that of the relatively cool liquid entering the reboiler to which the lighter vapor-liquid mixture in the reboiler is equivalent. The "equivalent liquid level" is, of course, less than the actual height of vapor-liquid mixture in the reboiler 22. To change the volume of liquid flowing to the reboiler it is, therefore, necessary to change the level of the liquid in the bottom of the column 10 with respect to the "equivalent liquid level" in the reboiler 22.

The level of the bottoms liquid 19 is determined by the liquid level control assembly consisting of the float chamber 27, the control box 28 and the diaphragm 29, all of which are well known in the art. Briefly, a change in the level of the bottoms 19 is transmitted to a float in the chamber 27 causing a force to be transmitted to the control box 28 through suitable lever arms not shown. This force is applied in the control box to change the air pressure on the diaphragm 30 of the diaphragm valve 29 thereby causing the valve 31 to open or close accordingly as the level of the bottoms is increasing or decreasing. Compressed air used to actuate the diaphragm valve 29 is supplied to the control box through line 32. The level at which it is desired to maintain the bottoms is changed by adjustment in the control box 28. The level of the reflux liquid in the downcomer 17, on the other hand, is determined by the quantity of reflux liquid, the size of the downcomer 17, and the liquid level in the bottom of column 10.

As mentioned above, by means of the reboiler system shown in Figure 1, the proportion of bottoms passing to the reboiler with the reflux may be controlled merely by changing the level of the bottoms. To illustrate, a condition will be assumed wherein it is desired to pass only reflux to the reboiler. In such case, it is necessary to adjust the level control 28 until the temperature of the liquid flowing through the drawoff pipe 21 is at a minimum. Since the reflux is always cooler than the bottoms, the temperature of the liquid in line 21 will be at a minimum when nothing but reflux is flowing therein.

By maintaining the level of liquid 19 at a predetermined point, it is thus possible to have a once-through operation, e. g. all of the reflux through pipe 17 goes through the reboiler 22 and there is zero circulation of the bottoms liquid 19. This results in the greatest mean temperature difference (MTD) in the reboiler and is most efficient.

If it is desired to mix some of the bottoms liquid 19 with the reflux in line 17, it is only necessary to raise the level of the liquid 19 by changing the setting of level control 28. Because of the increased static head thus made available, circulation of bottoms liquid is induced until the increased pressure drop caused by such circulation balances the increased static head imposed. It will also be apparent that if the reflux flow decreases, a greater amount of bottoms will flow and as this operation is automatic, the body of liquid 19 serves as a reserve, thereby preventing violent fluctuations in operation. Weir 20 is provided to maintain a liquid seal at the lower end of downcomer 17.

Starting up operations are readily accomplished by first establishing liquid equilibrium. The heat then applied by the reboiler 22 determines the vaporization and as the pressure drop is a function of vaporization, it is possible to set the level 19 at that point that will prevent flow of the bottoms liquid.

Alternatively the ratio of flow in draw-off line 21 could be controlled by a circulating pump such as a centrifugal pump in line 21, the circulation of which would be controlled by the amount of bottoms to be circulated. If for example the capacity of such a pump were set for the exact amount of reflux in pipe 17, no bottoms would flow. Any higher setting of capacity would, of course, include circulation of bottoms. The control of such pump could be based on temperature or other suitable factors.

In Figure 3 a modification of the apparatus of Figure 1 is shown wherein the products drawoff line 13 leaves the column at a suitable point above the outlet of the downcomer 17. In this case, the liquid seal is maintained by the relative elevations of the outlet to the products line 13 and the outlet of downcomer 17, and, therefore, weir 20 is not necessary. If the design of the outlet of downcomer 17 is such that there is a tendency for the path of the liquid flowing from downcomer 17 to diverge on leaving the downcomer, an opening of a slightly greater diameter must be made in the drawoff line 21 to receive all of the reflux. This is designated as 33. It is, of course, obvious that the same effect could be obtained by using the weir 20 of Figure 1 in place of this enlarged section as a guiding means for the reflux liquid. Also, a nozzle might be used at the outlet of the downcomer 17 in Figure 3 to achieve the same result.

It will be appreciated that the reflux material which overflows into trough 16 is partly liquid and partly vapor and the trough 16 is sufficiently wide and deep to make it self-venting. In some cases the bottom of the trough may even be below the liquid level of the bottoms liquid at 19. In general however, the liquid finally becomes vapor free and the small conduit 17 is sufficient to carry all of the reflux. In addition, the physical height of conduit 17 being as much as eight feet or more, the head of liquid will overcome any friction effect in the pipe or nozzle.

Although the spacing of the opening of the downflow pipe 17 from the inlet to the drawoff pipe 21 is not critical, it may be of importance under certain conditions. For instance, when as in Figure 3 neither a nozzle nor a weir is used, the downflow pipe should be spaced from the drawoff pipe a distance approximately equal to one-half the diameter of the downflow. This is only a rough approximation to give the order of magnitude of the spacing between the two. In all cases the downflow pipe 17 should be concentric with the opening to pipe 21 but neither need be centered in the tower.

Thus, I have provided a flexible reboiler system wherein the composition of the liquid passed to the reboiler may be controlled in a very simple manner. Further, any possibility of vapor binding or surging occurring in this system is practically eliminated since there is always some liquid available to be passed through the reboiler. If, for instance, the feed to the tower were interrupted for any reason, the amount of reflux available at the downcomer 17 would decrease rapidly as would the velocity head. The net result would be an increase in the flow of the bottoms to the reboiler so that there would always be a substantial amount of liquid entering the reboiler to prevent excessive heating therein.

Although I have described a preferred form of embodiment of my invention and a modification thereof, I am aware that modifications may be made thereto and I, therefore, desire a broad interpretation of my invention within the scope and spirit of the description herein and of the claims appended hereinafter.

I claim:

1. In a distillation system, a distillation column, a reboiler, and means to pass a liquid from said column to said reboiler, said means comprising a liquid collecting tray in the lower part of said column, an attenuated reflux conduit having an outlet at the lower end thereof and leading from said tray to a chamber in the bottom of said column whereby a dynamic liquid level may be maintained in said conduit, means to maintain a static liquid level in said chamber, means to vary said static level independently of said dynamic level, a drawoff line from said chamber, the inlet of said line being subjacent to and directly in line with said outlet of said reflux conduit and leading to said reboiler whereby reflux liquid descending in said conduit is substantially completely passed directly into said inlet, means to heat the liquid in the reboiler thereby partially vaporizing said liquid, means to return said partially vaporized liquid to said column above the static liquid level in said chamber, means to withdraw the liquid product from the bottom of said column, and a submerged upstanding plate in said chamber forming a weir extending upwardly from and enclosing the inlet of said drawoff line, said upstanding plate being laterally spaced from both the outlet of said reflux conduit and the inlet of said drawoff conduit.

2. In a distillation system, a distillation column, a reboiler, and means to pass a liquid from said column to said reboiler, said means comprising a liquid collecting tray in the lower part of said column, an attenuated reflux conduit having an outlet at the lower end thereof and leading from said tray to a chamber in the bottom of said column whereby a dynamic liquid level may be maintained in said conduit, means to maintain a static liquid level in said chamber, means to vary said static level independently of said dynamic level, a drawoff line from said chamber, the inlet of said line being subjacent to and directly in line with said outlet of said reflux conduit and leading to said reboiler whereby reflux liquid descending in said conduit is substantially completely passed directly into said inlet, means to heat the liquid in the reboiler thereby partially vaporizing said liquid, means to return said partially vaporized liquid to said column above the static liquid level in said chamber, means to withdraw the liquid product from the bottom of said column, and a submerged upstanding peripheral weir in said chamber extending above the lower end of said reflux conduit and laterally spaced therefrom, said weir enclosing the inlet of said drawoff line.

3. In a distillation system, a distillation column, a reboiler, and means to pass a liquid from said column to said reboiler, said means comprising a liquid collecting tray in the lower part of said column, an internal attenuated reflux conduit having an outlet at the lower end thereof and leading from said collecting tray to a chamber in the bottom of said column whereby a dynamic liquid level may be maintained in said conduit, means to maintain a static liquid level in said chamber, adjustable liquid level control means to vary said static level independently of said dynamic level, a drawoff line from said chamber having an inlet colinear with and immediately subjacent to the outlet of said reflux conduit and leading to said reboiler, an inlet to said drawoff line of greater diameter than the outlet of said reflux conduit whereby reflux liquid descending in said conduit is substantially completely passed into said inlet, means to add heat to said liquid entering said reboiler whereby the liquid is partially vaporized, means to return said partially vaporized liquid to said column above the liquid level therein, and a liquid product outlet in the lower part of said chamber at a point above the outlet of said reflux conduit.

WHEATON W. KRAFT.

REFERENCES CITED

The following references are of record in the file of this patent:

UNITED STATES PATENTS

| Number | Name | Date |
|---|---|---|
| 2,391,541 | Belchetz | Dec. 25, 1945 |
| 2,398,213 | Dutson et al. | Apr. 9, 1946 |

FOREIGN PATENTS

| Number | Country | Date |
|---|---|---|
| 471,667 | Great Britain | Sept. 6, 1937 |